United States Patent
Yang et al.

(10) Patent No.: US 10,462,137 B2
(45) Date of Patent: Oct. 29, 2019

(54) SECURE CONFIRMATION EXCHANGE FOR OFFLINE INDUSTRIAL MACHINE

(71) Applicant: Cisco Technology, Inc., San Jose, CA (US)

(72) Inventors: Xuechen Yang, Austin, TX (US); Nancy Cam-Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 524 days.

(21) Appl. No.: 15/010,939

(22) Filed: Jan. 29, 2016

(65) Prior Publication Data

US 2017/0223021 A1    Aug. 3, 2017

(51) Int. Cl.
*H04L 29/06*    (2006.01)
*G06Q 50/04*    (2012.01)

(52) U.S. Cl.
CPC .............. *H04L 63/10* (2013.01); *G06Q 50/04* (2013.01); *H04L 63/08* (2013.01)

(58) Field of Classification Search
CPC ....... H04L 63/10; H04L 63/08; G05B 19/418; G06Q 50/04
See application file for complete search history.

(56) References Cited

U.S. PATENT DOCUMENTS

| | | | | |
|---|---|---|---|---|
| 6,052,600 A | * | 4/2000 | Fette | G06F 21/121 370/329 |
| 2006/0095772 A1 | * | 5/2006 | Bell | H04L 9/0869 713/171 |
| 2013/0318343 A1 | | 11/2013 | Bjarnason et al. | 713/157 |
| 2014/0359457 A1 | * | 12/2014 | Bellan | H04L 41/22 715/736 |
| 2015/0372875 A1 | * | 12/2015 | Turon | H04W 76/10 370/254 |
| 2016/0170825 A1 | * | 6/2016 | Nguyen | G06F 11/0751 714/15 |
| 2016/0373418 A1 | * | 12/2016 | Stahl | G06F 21/33 |

* cited by examiner

Primary Examiner — Linglan E Edwards
Assistant Examiner — Forrest L Carey
(74) Attorney, Agent, or Firm — Campbell Stephenson LLP

(57) ABSTRACT

In one embodiment, a system and method are disclosed for receiving a request for authorization to commission a target device based, at least in part, on a plurality of requested commissioning actions; determining whether each of the requested commissioning actions is authorized; sending a commissioning authorization, which includes information identifying the one or more authorized commissioning actions; receiving a commissioning complete confirmation message, which includes information identifying one or more completed commissioning actions; validating the commissioning complete confirmation message, in order to ensure that each of the completed actions had been previously authorized; and if all of the completed commissioning actions were previously authorized, sending an acknowledgement message.

19 Claims, 7 Drawing Sheets

SECURE CONFIRMATION EXCHANGE FOR OFFLINE INDUSTRIAL MACHINE

FIELD OF THE INVENTION

This disclosure generally relates to the field of industrial machines, and more specifically to the commissioning of a target device in an industrial environment including an asset management device.

BACKGROUND OF THE INVENTION

In industrial automation environments, for example, a target device built by a manufacturer must often be commissioned to suit a broader application, such as, e.g., a controller that must be commissioned for use in an industrial automation system. This commissioning is performed by an integrator, such as an Original Equipment Manufacturer (OEM) builder. The overarching process of building a machine can include adding, for example, one or more hardware, software, or network components (each of which can be a "target device") to the machine. The commissioning begins by physically attaching the target device to an OEM builder device. Upon being attached to the OEM builder device, the OEM builder device can be used to perform one or more commissioning actions on the target device, such as commissioning a network, operating system, or application(s). Moreover, the commissioning actions can be registered with an asset registry, which can be part of a larger asset management system. The commissioning environment is typically an isolated local network that does not provide Internet connectivity for the target device, but where the target device instead is bound to a proprietary or other non-IP network that is not connected to an enterprise network or to the cloud. The technician who is building the machine (the "OEM Builder") generally has Internet access, either through a different device, such as a smart phone; or through the OEM builder device, when connected to a different network. Thus, in order to communicate between OEM builder device and the asset registry, as is needed for the commissioning process, the OEM builder may have to manually copy message content back and forth between the target device, the OEM builder (commissioning process) and the asset registry, thereby decreasing efficiency, and increasing the probability of an error or even providing the ability for an OEM builder to circumvent necessary security measures pertaining to the target device.

BRIEF DESCRIPTION OF THE DRAWINGS

Embodiments such as those described herein may be better understood, and its numerous objects, features and advantages made apparent to those skilled in the art by referencing the accompanying drawings.

Figure 1:
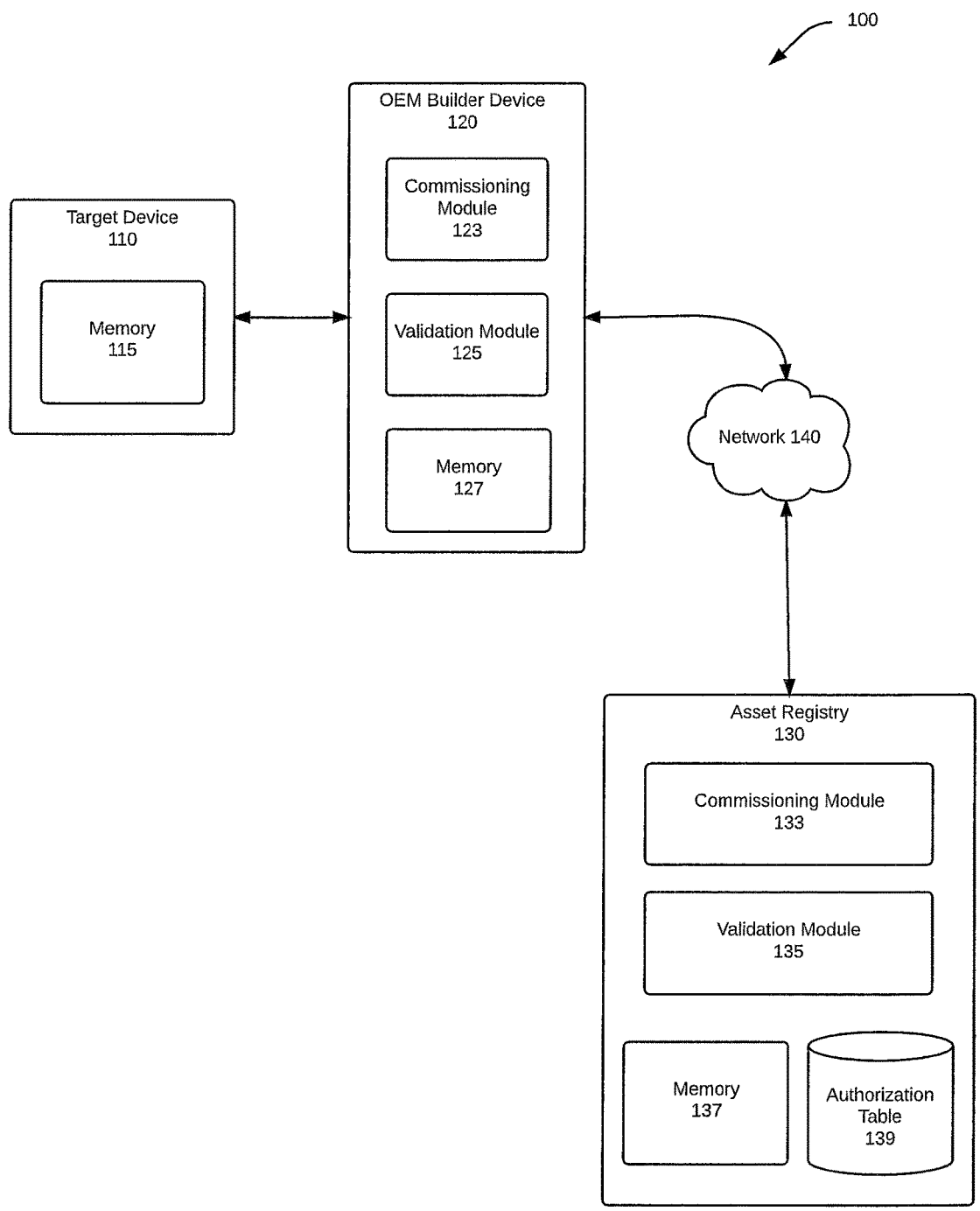
FIG. 1 is a block diagram depicting commissioning environment, including, e.g., a target device, an OEM builder device, and an asset registry of an asset management system, connected at least in part via a network.

While the methods and systems described herein are susceptible to various modifications and alternative forms, specific embodiments thereof are provided as examples in the drawings and detailed description. It should be understood that the drawings and detailed description are not intended to limit such embodiments to the particular form(s) disclosed. Instead, the intention is to cover all modifications, equivalents and alternatives falling within the spirit and scope of the appended claims.

DETAILED DESCRIPTION

Overview

Disclosed herein are various systems and methods for the secure commissioning of a target device. For example, one method involves establishing a trust relationship between a target device and an asset registry, via a OEM builder device that is connected to both the target device and the asset registry. Upon establishing a trust relationship, an OEM builder uses the OEM builder device to seek and receive permission from the asset registry to perform certain, specific commissioning actions on the target device. After receiving this permission, the OEM builder device then performs the authorized commissioning actions on the target device. After the commissioning has been completed, the target device informs the asset registry as to what commissioning actions were performed by the OEM builder device, via a commissioning complete confirmation message to the asset registry. The asset registry uses information included in the commissioning complete confirmation message to validate that the message was sent by the target device, and further to confirm that the OEM builder device only performed the commissioning actions that the OEM builder device was authorized to perform. If the asset registry is able to successfully complete this validation and confirmation of the commissioning complete message, the asset registry sends an acknowledgement message back to the target device, indicating that the OEM builder device only performed the commissioning actions that the OEM builder device was authorized to perform. Upon receipt of this acknowledgement message, the target device is able to determine that the commissioning actions performed by the OEM builder device were all authorized by the asset registry for the current OEM builder to perform on the target device.

Commissioning a Target Device

Generally speaking, the term commissioning, as used herein, pertains to the process of connecting, configuring, and testing a device or another piece of computer equipment (collectively, "target device"). Commissioning can be performed when a target device is connected to a OEM builder device built by an Original Equipment Manufacturer (OEM). Commissioning can include the performance of certain commissioning actions by an OEM builder, such as commissioning an operating system (OS), commissioning a network configuration, commissioning security applications and credentials, and commissioning one or more applications. Each commissioning action can potentially be performed by a different OEM builder, even if those different commissioning actions are all performed on the same target device. Thus, as one example, one OEM builder can commission the OS on a target device, another OEM builder can commission the network used by the target device, and one or more additional OEM builders can commission one or more software applications that are to be installed on the target device.

As used herein, an asset tracking and lifecycle management system ("asset management system") pertains to a system that may be used to track commissioning actions. An asset management system can be any combination of hardware and/or software that can monitor and track various network resources, including machines and target devices as those terms are used herein. Among other functionality, an asset management system can be used to track the manner in which various resources are deployed within a company's network of machines. Among other attributes, an asset management system can be used to track the location and lifecycle of various assets (e.g., machines and devices) that are deployed within a network, such as, e.g., a network containing industrial devices (or other industrial equipment), such as those described herein. For instance, if a company has procured a certain number of licenses to a particular operating system, the asset management system can track the particular machines on which each of those licenses are being used, and can also ensure that the allotted number of licenses are not exceeded. In another instance, the asset management system can track the remaining lifecycle of a given piece of equipment (such as, e.g., an industrial machine or other industrial equipment, or a device such as the target devices discussed herein), in order to determine how long that piece of equipment has been "in service," and when that piece of equipment should be replaced, upgraded, or updated. As discussed herein, these features and other functionality, as described herein, can be performed by an asset registry, which can be a hardware and/or software component within an asset management system. In one embodiment, an asset registry can be cloud-based. In one embodiment, an asset registry can function as a central authority for authenticating OEM Builders and authorizing commissioning (or provisioning) actions, as discussed in more detail elsewhere herein.

In addition to this tracking functionality, the asset registry (or another component of the asset management system) can be used to oversee the commissioning process. In this aspect, the asset registry (or similar component of the asset management system) can be used to verify that the OEM builder device is authorized to perform the specific commissioning actions that the OEM builder device has requested to perform. The verification process can include, at least in part, validating an identification value embedded in the target device and validating an identification value embedded in the OEM builder device, with each of those identification values having been embedded by the respective manufacturers of the target device and the OEM builder device. The verification process can also include querying an authorization table to determine whether the OEM builder using the OEM builder device has permission to perform the specific commissioning actions being requested, and whether those specific commissioning actions can be performed on the target device being commissioned. After the commissioning actions have been completed, the asset registry confirms that the OEM builder device only performed the commissioning actions that the OEM builder device had been authorized to perform.

Commissioning Environment

FIG. 1 shows a diagram of an environment for commissioning a target device, such as commissioning environment 100. As is depicted in FIG. 1, a target device 110 is connected to an OEM builder device 120. Target device 110 can be any hardware or other physical component that is capable of being inserted into or connected to a OEM builder device, such as OEM builder device 120. Target device 110 also includes, or is communicatively coupled to, a memory, such as memory 115. Memory 115 can take the form of any non-transient computer-readable storage medium, examples of which are provided throughout this disclosure.

An OEM builder device, such as OEM builder device 120, can be any computing device capable of being used by an Original Equipment Manufacturer (OEM) to commission a machine, piece of equipment, or other device, such as target device 110. Target device 110 can, for example, be any industrial machine or other industrial equipment such as, for example, a welding machine, a painting machine, a pill-filling machine, or any other industrial machine. OEM builder device 120 can be, for example, a personal computer, laptop computer, or other computing device, such as those described herein. In addition to other features and functionality, OEM builder device 120 includes a stand-alone software program, and/or a subcomponent of a software program or other computer code, among other examples, such as commissioning module 123 and validation module 125, which are configured to perform actions such as those described herein. Additionally, OEM builder device 120 includes, or is communicatively coupled to, a memory, such as memory 127. Memory 127 can take the form of any non-transient computer-readable storage medium, examples of which are provided throughout this disclosure. Although not expressly depicted in FIG. 1, OEM builder device 120 can be operated by an entity (e.g., a person, organization, group, or the like, including as one example as a computer technician associated with a given OEM). As used throughout this disclosure, such a person and/or group of people or organization will be referred to herein as an "OEM builder." In one embodiment, OEM builder device 120 can be used by OEM builder as a proxy for the target device with respect to communication sent to, and received from, asset registry 130, described in more detail below. As described herein, an OEM builder can use OEM builder device 120 to prepare target device 110 for use by performing some, but not necessarily all, of the steps and methods described herein.

Although target device 110 is shown as being directly connected to OEM builder device 120 in FIG. 1, target device 110 can be indirectly connected to OEM builder device 120 in other embodiments, such as via a Programmable Logic Controller ("PLC"), PC card, network interface, or other similar connection devices. In other embodiments, target device 110 can be connected to OEM builder device 120 via a different connection, such as, e.g., a USB connection, Micro USB connection, LIGHTNING® connection, Near Field Communication (NFC) connection, Bluetooth connection, or other connections. For the purposes of the instant disclosure, the precise method of connection is not as important as the fact that target device 110 is communicatively coupled to OEM builder device 120 in some manner.

FIG. 1 also depicts an asset tracking and lifecycle management system ("asset management system"), which includes asset registry 130. As indicated above, an asset management system can be any combination of hardware and/or software that can monitor and track various network resources, including machines and target devices as those terms are used herein. Among other functionality, an asset management system may be used to track the manner in which various resources are deployed within a company's network of machines. Among other attributes, an asset management system can be used to track the location and lifecycle of various assets (e.g., machines and devices) that are deployed within a network, such as, e.g., a network containing industrial devices (or other industrial equipment), such as those described herein. As discussed herein, these features and other functionality can be performed by an asset registry, such as asset registry 130. Asset registry 130 can be any hardware and/or software component within an asset management system. In one embodiment, an asset registry can be cloud-based. In one embodiment, an asset registry can function as a central authority for authenticating OEM Builders and authorizing commissioning (or provisioning) actions, as discussed in more detail elsewhere in this disclosure. In one embodiment, asset registry 130 can be a networking device, such as, e.g., the networking devices depicted in FIGS. 5 and 6, both of which are discussed in more detail below.

As shown in FIG. 1, asset registry 130 is connected to OEM builder device 120 via a connection, such as network 140. In one embodiment, network 140 is an isolated local network. In other embodiments, a different type of network can be used, such as the Internet. As indicated above, an asset management system can be any combination of hardware and/or software that can monitor and track various network resources, including machines and target devices as those terms are used herein. Thus, an asset management system can be any computerized system that is capable of managing the assets of network 100. At the very least, an asset management system will include a hardware device (such as, e.g., a personal computer, server, or similar device) that is capable of storing and executing a software program. Asset registry 130 can include both the necessary hardware, as well as any form of software or computer code that is capable of being used to monitor the assets on a network, such as network 100. Asset registry 130 can include a stand-alone software program, and/or a subcomponent of a software program or other computer code, among other examples, such as commissioning module 133 and validation module 135, which are configured to perform actions such as those described herein. Asset registry 130 also includes, or is communicatively coupled to, a memory, such as memory 137. Memory 137 can take the form of any non-transient computer-readable storage medium, examples of which are provided throughout this disclosure. Asset registry can also include an authorization table, or similar logical memory structure (e.g., a database), such as authorization table 139, which is discussed in more detail elsewhere in this disclosure.

Although a single OEM builder device 120 and a single asset registry 130 are depicted in FIG. 1, in practice multiple OEM builder devices and/or multiple asset registries may be needed to completely commission all relevant components of a given target device, such as target device 110. For ease of discussion, however, the systems and methods herein will be described with reference to a single pass through the commissioning process described herein, and thus will be described with reference to a single OEM builder device (e.g., OEM builder device 120) and a single asset registry (e.g., asset registry 130). In practice, other embodiments are possible.

OEM Builder Device's Role in Commissioning

Figure 2:
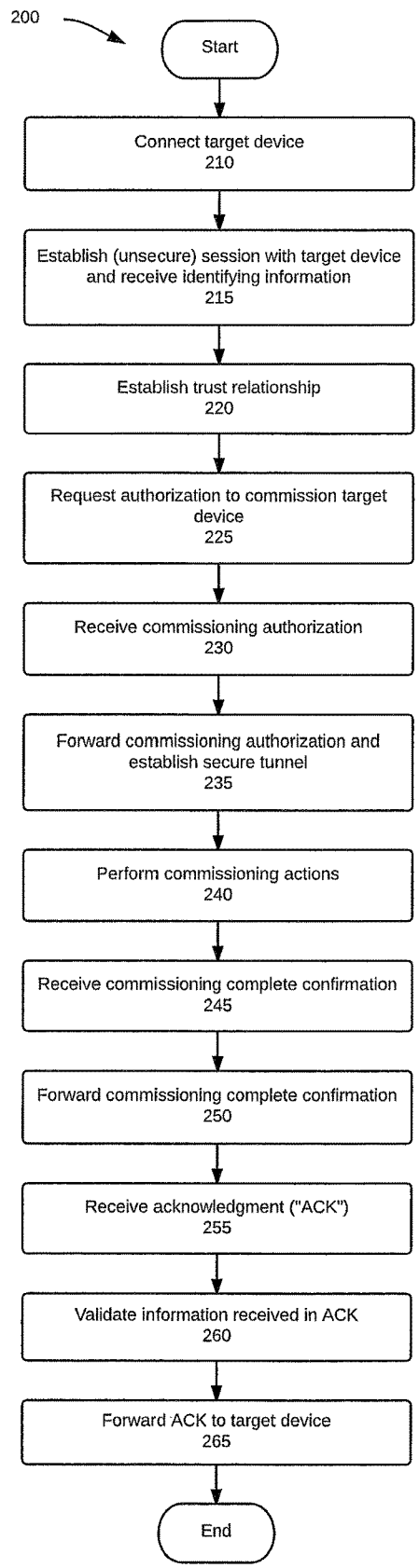
FIG. 2 is a flowchart that illustrates actions that can be performed by an OEM builder or an OEM builder device as part of commissioning a target device, in conjunction with an asset registry, according to one embodiment.

FIG. 2 is a flowchart of a method 200, which illustrates various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 200, which is described with reference to the example elements shown in FIG. 1, shows the workflow used to commission a target device, as understood from the perspective of the OEM builder device. This commissioning can begin in step 210, when a target device, such as target device 110, is connected to an OEM builder device, such as OEM builder device 120. As depicted in FIG. 1, the OEM builder device is also connected to a component of an asset management system, such as asset registry 130. In one embodiment, method 200 can be automatic, in that the provisioning does not require any human intervention. In another embodiment, the commissioning may be initiated by a human user, such as a technician who connects a target device to an OEM builder device. In either scenario, the steps of method 200 are substantially the same.

Once the target device is connected to the OEM builder device, the OEM builder device establishes a communication "session" with the target device, as shown in step 215. In one embodiment, this session can be established by using a protocol such as, e.g., the Common Industrial Protocol ("OP"). On first contact, this protocol can use unprotected transports, such as unprotected Transmission Control Protocol ("TCP") and User Datagram Protocol ("UDP") transports. This step will typically result in an unsecured session, although a secured session may alternatively be created in this step. This step also includes extracting, or otherwise receiving, information that identifies the target device. In one embodiment, this identifying information can be in the form of a "Target Device ID" ("TDiD") value. This identifying information will typically be embedded or hardcoded into the target device by the manufacturer of that device, and cannot be modified in the normal course of performing the methods and actions described herein. This identifying information may be stored in any non-transient, computer-readable storage medium of the device, such as memory 115. In other embodiments, other variable names can be used. What matters, however, is that some form of unique identification is associated with the target device and provided to, and received by, the OEM builder device, which receipt also occurs in step 215.

In addition to establishing the aforementioned session with the target device, the OEM builder device also establishes "a trust relationship" (e.g., a secure transportation tunnel) with the asset management system, as shown in step 220. In one embodiment, the trust relationship is established between an OEM builder device, such as OEM builder device 120, and an asset management device, such as asset registry 130. The establishment of this trust relationship can include, for example, establishing a protected tunnel, such as a Transport Layer Security ("TLS") tunnel. This protected tunnel can be established via a direct connection, or via a network such as network 140. This secure tunnel can be established by providing, e.g., a digital certificate (such as is described elsewhere herein) or a username-password combination to the asset management system. Although each of the steps in this method can be performed in an order other than the one presented herein, this step in particular can be performed prior to the connection of the target device and the establishment of the communication session between the target device and the OEM builder device, as shown in steps 210 and 215, respectively.

Method 200 then proceeds to step 225, where the OEM builder device (or an operator of the OEM builder device, such as, e.g., an OEM builder) can request authorization from an asset management device to commission a target device. For instance, OEM builder device 120 can request authorization from asset registry 130 to perform one or more certain, specific commissioning actions for target device 110 (hereinafter, the certain, specific commissioning actions requested are referred to as the "requested commissioning actions"). As discussed elsewhere herein, commissioning actions can include, e.g., commissioning an OS, commissioning a network, and/or commissioning one or more applications, among other potential commissioning actions. The specificity of the list of requested commissioning actions is important. Later in this process, asset registry 130 uses this list of requested commissioning actions to confirm that OEM builder device 120 only performed the specific commissioning actions that OEM builder device 120 was given permission to perform. Thus, with respect to this step, however, the requested commissioning actions should be more specific than the generalized lists of potential commissioning actions provided elsewhere in this disclosure. For instance, instead of requesting permission to commission an OS in general, the OEM builder device should request permission to commission a specific OS, such as various WINDOWS® operating systems (e.g., WINDOWS® XP, WINDOWS® NT, WINDOWS® 2000, and WINDOWS VISTA®), or other operating systems, such as, e.g., a LINUX® operating system. Similarly, instead of requesting permission to generally commission an application, the OEM builder device should request permission to commission a specific application, such as, e.g., various applications that can be used to program PLCs or other devices. Although not required, the list of requested commissioning actions can also include additional detail, such as a version and/or build number for an OS or a software application. (As used throughout this disclosure, the word "list" is used in the generalized sense, and is not intended to refer a specific data structure, although a "list" may take the form of a "list" data structure as well.) This specificity is important because, for example, a certain OEM builder may have authorization to install certain WINDOWS® operating systems, but that does not necessarily mean that the same OEM builder has authorization to install a LINUX® operating system, for example. Moreover, a company may have a certain number of licenses for a given version of a specific component, in which case the asset registry may track those licenses to ensure that the number of installed products does not exceed the number of authorized licenses.

In response to this request, asset registry 130 can provide a commissioning authorization, such as, e.g., a digital commissioning certificate or a token (collectively, "commissioning certificate," or more simply, "certificate") to OEM builder device 120. Among other attributes, the commissioning certificate includes information indicating the specific commissioning actions that are authorized to be performed ("authorized commissioning actions") by OEM builder device 120 on target device 110. (As will be discussed in more detail in conjunction with the discussion of FIG. 4, the authorized commissioning actions will usually be identical to the list of requested commission actions, but this need not necessarily be the case.) This information indicating the authorized commissioning actions is saved by target device 110, and can later be used by target device 110 to ensure that OEM builder device 120 only performed the commissioning actions for which OEM builder device 120 was given permission to perform. In one embodiment, this certificate is signed by asset registry 130, and thus contains information that identifies asset registry 130. Moreover, this digital commissioning certificate can be used to encrypt communications between two devices. As such, in one embodiment, the commissioning certificate includes information that identifies a given device (in addition to other information, some of which is described herein). In one embodiment, the commissioning certification is also encrypted using a security protocol such as, e.g., Public Key Infrastructure (PKI) or Secure Socket Layer (SSL). In one embodiment, the certificate and a private key are embedded into the asset registry during the manufacturing process, and cannot be modified in the normal course of performing the methods and actions described herein. OEM builder device 120 receives the commissioning certificate in step 230

Upon being received by OEM builder device 120 in step 230, OEM builder device 120 then forwards the commissioning certificate to target device 110, in step 235. OEM builder device 120 can use the commissioning certificate to establish a secure tunnel between OEM builder device 120 and target device 110, also as part of step 235. This secure tunnel can be established using TCP or UDP, or both, and can involve using TLS to create the communication tunnel between OEM builder device 120 and target device 110. While these protocols are provided as examples herein, other suitable protocols can be used in practice without hindering the functionality of the instant disclosure.

Method 200 then proceeds to step 240, where the authorized commissioning actions are performed on target device 110. (As will be discussed in more detail below, particularly with respect to the discussing regarding FIG. 3, the target device will validate the commissioning certificate prior to OEM builder device 120 performing the authorized commissioning actions.) In one embodiment, the authorized commissioning actions can be automatically initiated and performed by OEM builder device 120. In another embodiment, the authorized commissioning actions can be initiated or performed by an OEM builder using OEM builder device 120. In either scenario, and as mentioned above, these commissioning actions can include, e.g., commissioning an operating system (OS), commissioning a network, and commissioning one or more applications. Each commissioning action can potentially be performed by a different OEM builder, even if those different commissioning actions are all performed on the same target device. However, each OEM builder can only perform the specific commissioning actions for which that OEM builder has requested, and received, permission to perform, such as via the commissioning certificate received from asset registry 130 in step 230.

Once the authorized commissioning actions have been completed, OEM builder device 120 will receive a "commissioning complete" confirmation message from target device 110, in step 245. As will be discussed in more detail below, this commissioning complete confirmation message is generated by target device 110. This commissioning complete message will generally take the form of an electronic message, such as a data packet or other digital communication. The commissioning complete confirmation message (or simply, "confirmation message" for short) will contain a first cryptographic nonce (e.g., "nonce1"), or "nonce" for short. A nonce can be any random or pseudo-random string of alphanumeric characters or symbols that can be used to make a message unique, and can also contain a timestamp. Among other uses, a nonce can be used to ensure that a message is only used once, and to help prevent replay attacks. (For instance, an OEM builder could have commissioned the target device at some point in the past, and that OEM builder (or the OEM builder device) could have kept the message used during that commissioning. A situation could arise in the present where the OEM Builder wants to update the target device with malware. The use of a nonce prevents this type of attack. As another example, the target device could have been previously commissioned by a malicious OEM Builder pretending to be this OEM Builder, this prevents the malicious OEM Builder from replaying the commissioning operation through this nonce.) In addition to the nonce, the commissioning complete message also includes values representing the identity of target device 110 and the identity of OEM builder device 120, respectfully. These values may take the form of a variable, such as, e.g., a TDiD representing the identity of target device 110, and an OBiD representing the identity of the OEM builder that performed the commissioning action(s). In other embodiments, different variable names and/or values can be used to represent the identities of target device 110 and the OEM builder.

Additionally, the commissioning complete confirmation message can also include information indicating the commissioning actions that have been performed on target device 110 ("completed commissioning actions"). This information may take the form of a "Commissioning Code" variable, and associated value, as discussed in more detail elsewhere in this disclosure. The Commissioning Code variable and value can be expressed in various formats, including a simple alphanumeric value, an XML file, a schema, or any other form of communicating the commissioning actions that were performed. Although generally discussed in the singular throughout this disclosure, the Commissioning Code variable may, in practice, contain multiple commissioning codes. For instance, the Commissioning Code can include a first code indicating a first application to be commissioned, a second code indicating a second application to be commissioned, and a third code indicating a third commissioning action, such as, e.g., commissioning an OS. In one embodiment, the Commissioning Code can include a single value representing multiple commissioning actions. Regardless of the specific format of the Commissioning Code(s), the information provided in this variable (or other construct) allows asset registry 130 to confirm that each of the completed commissioning actions were among the authorized commissioning actions. (Generally speaking, each of the authorized commissioning actions will actually be performed on target device 110. However, all of the authorized commissioning actions do not necessarily have to be performed on target device 110. The functionality disclosed herein will still work even if less than all of the authorized commissioning actions are performed, as long as no unauthorized commissioning actions are performed.)

When generating the confirmation message, target device 110 cryptographically binds the aforementioned information (e.g., nonce1, TDiD, OBiD, and Commissioning Code, and/or similar values and/or other information) within a Message Authentication Code (MAC). Cryptographically binding this information within the MAC makes the message unique, and prevents an intermediary device (e.g., OEM builder device 120) from modifying the substance of the commissioning complete message. (As will be discussed below, and notwithstanding the foregoing statement, OEM builder device 120 can additionally add information to the commissioning complete message—but OEM builder device 120 cannot change the substance of the message as sent by target device 110, unless OEM builder device 120 is aware of the target device's identity value (e.g., TDiD). If OEM builder device 120 is aware of the target device's identity code, or otherwise obtained the key to change the MAC, then OEM builder device 120 could then impersonate target device 110 and potentially perform unauthorized actions with respect to OEM builder device 120. While this disclosure provides, in part, for preventing that situation, the manner in which that situation could be handled if it did exist is beyond the scope of this disclosure and will not be discussed further herein.) In certain embodiments, the MAC is based on a security algorithm such as a Digital Signature Algorithm (DSA), an Elliptical Curve Digital Signature Algorithm (ECDSA), a Rivest-Shamir-Adleman (RSA) algorithm, or any other appropriate security algorithm. Regardless of which security algorithm is used, the MAC is generated in one embodiment based on the first cryptographic nonce (e.g., "nonce1"), the identification value for target device 110 (e.g., "TDiD"), the identification value for the OEM builder (e.g., "OBiD"), and the Commissioning Code(s). In other embodiments, different inputs may be used to generate the MAC. Moreover, as stated above, the variable names for each of these inputs may vary in different embodiments.

Upon receiving the confirmation message, OEM builder device 120 will not change the underlying confirmation message, but will add a "code" of its own to the packet in step 250. This "code" includes the OEM builder device's own nonce (e.g., "nonce2"), which will be encrypted within a MAC generated by OEM builder device 120. In one embodiment, the MAC is generated based on the OEM builder device's nonce (e.g., "nonce2"), the identification value for target device 110 (e.g., "TDiD"), and the identification value for the current OEM builder (e.g., "OBiD"). After OEM builder device 120 adds its own MAC to the confirmation message packet, OEM builder device 120 will then complete step 250 by forwarding the packet to asset registry 130.

As will be discussed in more detail below, upon receipt of the commissioning complete confirmation message from OEM builder device 120, asset registry 130 will validate the commissioning complete confirmation message. This validating can include an analysis of both MAC values, as well as the Commissioning Code (or similar) value. Once those values are validated, asset registry 130 will construct an acknowledgement message (e.g., an "ACK") by including the nonce from target device 110 (e.g., nonce1), the nonce from OEM builder device 120 (e.g., nonce2), the identification value associated with target device 110 (e.g., TDiD), and the identification value associated with the current OEM Builder (e.g., OBiD). As is discussed in more detail elsewhere herein, asset registry 130 cryptographically binds these values in a MAC. In one embodiment, this MAC is based on nonce1, nonce2, TDiD, and OBiD. In another embodiment, the Commissioning Code is also part of this MAC. In other embodiments, this MAC can be based on different values and/or values represented by different variable names. Once the ACK message is generated, asset registry 130 forwards the ACK message to OEM builder device 120.

OEM builder device 120 receives the ACK message from asset registry 130, in step 255. Upon receiving the ACK message, OEM builder device 120 validates OEM builder device 120's own nonce (e.g., nonce2), the identities of both the current OEM builder and target device 110 (e.g., OBiD and TDiD, respectively), and the MAC received from asset registry 130. In another embodiment, the Commissioning Code is also considered in performing this validation. This validation occurs in step 260. Once the validation is completed, OEM builder device 120 forwards the ACK message to target device 110, in step 265. In one embodiment, OEM builder device 120 does not make any changes to the ACK message prior to forwarding the ACK message to target device 110. As will be discussed below, this final ACK message is received and validated by target device 110 to complete the commissioning process.

In the discussions provided herein, method 200 (and other methods) are described as if a single OEM builder is using a single OEM builder device 120 to perform all relevant actions. However, in practice, different OEM builders can perform one or more of the methods (or steps) disclosed herein at different times. However, each OEM builder can only perform the specific commissioning actions for which that OEM builder has both requested, and received, permission to perform from asset registry 130. Thus, as will be discussed in more detail below, it is important to know which OEM builder is authorized to perform which commissioning actions. As will be discussed in more detail below, an authorization table associated with asset registry 130 (such as, e.g., authorization table 139) can be used to help track this information.

Target Device's Role in Commissioning

Figure 3:
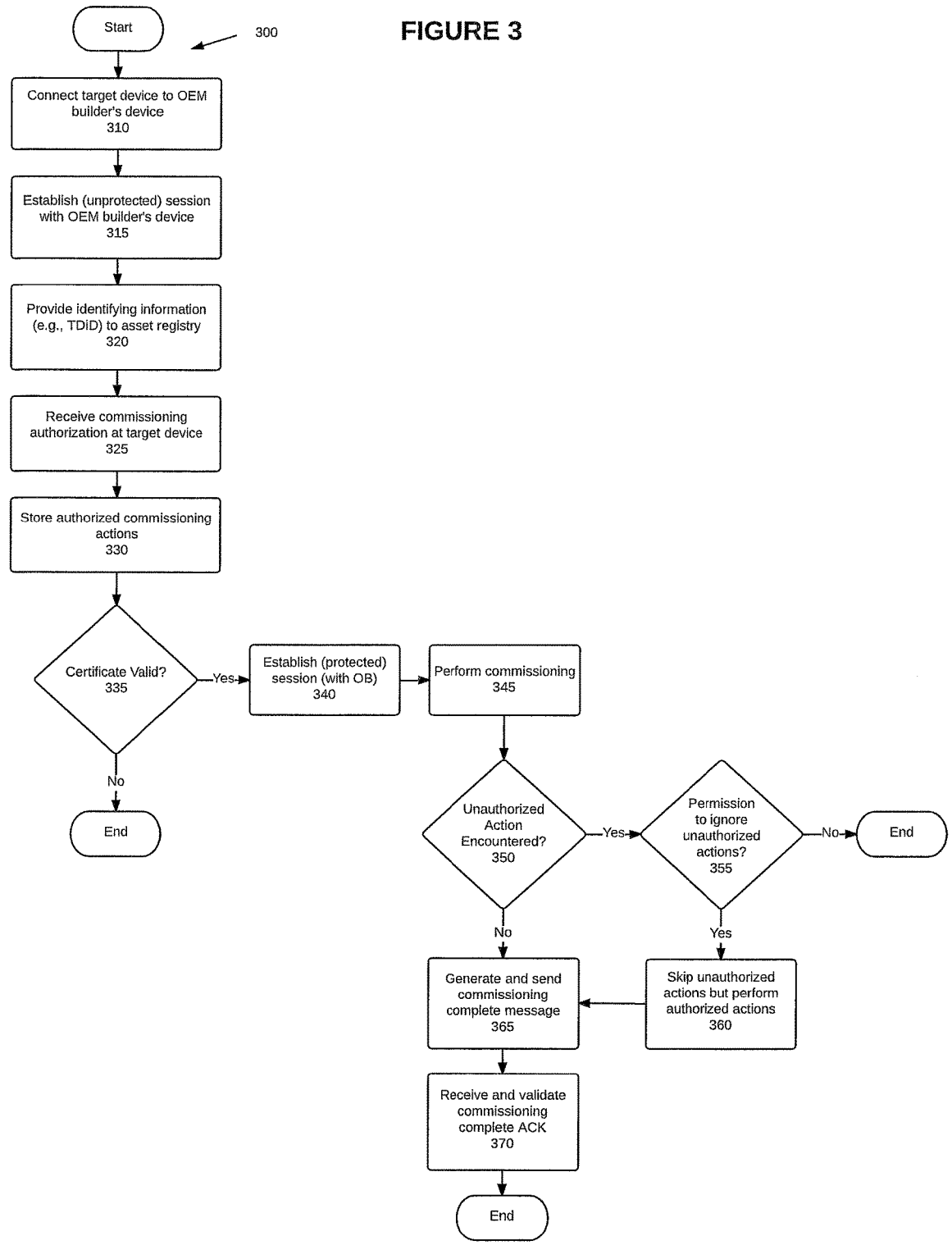
FIG. 3 is a flowchart that illustrates actions that can be performed by a target device as part of being commissioned by an OEM builder or OEM builder device, in conjunction with an asset registry, according to one embodiment.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 300, which is described with reference to the example elements shown in FIG. 1, shows the workflow used to commission a target device, as understood from the perspective of the target device. This commissioning begins in step 310, when a target device, such as target device 110, is connected to an OEM builder device, such as OEM builder device 120. As depicted in FIG. 1, the OEM builder device is also connected to an asset management device, such as asset registry 130. In one embodiment, method 300 can be automatic, in that the provisioning does not require any human intervention. In another embodiment, the commissioning may be initiated by a human user, such as a technician (e.g., an OEM builder) who connects a target device to an OEM builder device. In either scenario, the steps of method 300 are substantially the same.

Once target device 110 is connected to OEM builder device 120, the target device establishes a communication "session" with the OEM builder device, as shown in step 315. In one embodiment, this session can be established by using a protocol such as, e.g., the Common Industrial Protocol ("OP"). On first contact, this protocol can use unprotected transports, such as unprotected Transmission Control Protocol ("TCP") and User Datagram Protocol ("UDP") transport layer protocols. This step will typically result in an unsecured session, although a secured session may alternatively be created in this step. In conjunction with step 315, the target device provides to the OEM builder device information that identifies the target device in step 320. In one embodiment, this identifying information can be in the form of a "Target Device ID" ("TDiD") value. This identifying information will typically be embedded or hard-coded into the target device by the manufacturer of that device, and cannot be modified in the normal course of performing the methods and actions described herein. This identifying information may be stored in any non-transient, computer-readable storage medium of the target device, such as memory 115. In other embodiments, other variable names can be used. What matters, however, is that some form of unique identification is associated with the target device and provided to the OEM builder device.

As described in more detail above, OEM builder device 120 can then request authorization from the asset management system to commission target device 110. In response to that request, OEM builder device 120 can receive a commissioning certificate from asset registry 130. OEM builder device 120 forwards this commissioning certificate to target device 110, which receives the commissioning certificate in step 325. As explained in more detail elsewhere herein, this certificate can indicate the specific commissioning actions that have been authorized to be performed by OEM builder device 120 on behalf of target device 110, i.e., the "authorized commissioning actions." This commissioning certification can also include other information, such as is discussed elsewhere herein.

Target device 110 stores the list of authorized commissioning actions in a memory, such as memory 115, as shown in step 330. In one embodiment, the list of authorized commissioning actions can be stored in a logical memory structure, such as a database, table, or file. Although these memory structures are provided as examples herein, the list of request commissioning actions can be stored in any non-transient, computer-readable storage medium, such as memory 115. This information is used later in this process by target device 110 to ensure that OEM builder device 120 only performs the commissioning actions that the given OEM builder was authorized to perform, and that OEM builder device 120 does not perform (or attempt to perform) any commissioning actions that are not included in the list of authorized commissioning actions.

Target device 110 then validates the certificate in step 335. In one embodiment, this validation is performed using a pre-provisioned root certificate (or a "trust anchor"), which may take the form of a certificate chain (collectively, "pre-provisioned root certificate"). The pre-provisioned root certificate is generally pre-installed or otherwise included in target device 110 by the manufacturer of that target device. In one embodiment, the certificate and a private key are embedded into the target device during the manufacturing process, and cannot be modified in the normal course of performing the methods and actions described herein. In one embodiment, the validation of step 335 is performed by comparing the asset registry's signature to the list of entries in the pre-provisioned root certificate, in order to determine if the asset registry's signature is included in that list. If target device 110 determines in step 335 that the commissioning certificate is not valid (e.g., if the asset registry's signature is not found in the pre-provisioned root certificate's list(s) of entries), method 300 ends.

If target device 110 determines in step 335 that the commissioning certificate is valid (e.g., if the asset registry's signature is found in the pre-provisioned root certificate's list(s) of entries), method 300 will proceed to step 340. In step 340, a secure tunnel is established between OEM builder device 120 and target device 110. As indicated above, this secure tunnel can be established using a protocol such as, e.g., TCP, UDP, or a combination of TCP and UDP; and can involve using TLS to create the tunnel between OEM builder device 120 and target device 110. While these protocols are provided as examples herein, other suitable protocols can be used in practice without hindering the functionality of the instant disclosure.

In step 345, OEM builder device 120 begins performing commissioning actions on target device 110 via a secure tunnel between target device 110 and OEM builder device 120. In one embodiment, the commissioning actions can be automatically performed by OEM builder device 120. In another embodiment, the authorized commissioning actions can be performed by a human technician (such as, e.g., an OEM builder) using OEM builder device 120. Although not expressly depicted in FIG. 3, in practice each commissioning action can potentially be performed by a different OEM builder. However, each OEM builder can only perform the specific commissioning actions for which that OEM builder has requested, and received, permission to perform, such as via the commissioning certificate received from asset registry 130 in step 325.

Although the commissioning actions being performed in step 345 should generally match the list of authorized commissioning actions stored in step 330, target device 110 can nevertheless verify each commission action to determine whether each of the commissioning actions being performed is authorized. This verification is shown in step 350, where target device 110 analyses each commissioning action being performed to determine if any of those commissioning actions are unauthorized (e.g., not included in the list of authorized commissioning actions). If any unauthorized commissioning actions are encountered in 350, target device 110 will then determine in step 355 if the target device has been configured (such as, e.g., by the manufacturer of the target device) to ignore the unauthorized commissioning actions but still perform any commissioning actions that are authorized. If target device 110 determines in step 355 that the target device is not configured to ignored unauthorized commissioning actions, then method 300 will end immediately following step 355. Alternatively, if an affirmative determination is made in step 355, the target device skips any unauthorized commissioning actions that are encountered, but performs the authorized commissioning actions, as shown in step 360. In any of the scenarios where one or more commissioning actions are performed, target device 110 generates a record of the commissioning actions that are performed by OEM builder device 120 ("completed commissioning actions"), and maintains that record in a non-transient computer-readable storage medium, examples of which are enumerated elsewhere in this disclosure.

Once the authorized commissioning actions have been performed, method 300 proceeds to step 365. In step 365, target device 110 will generate a "commissioning complete" confirmation message and send that message to OEM builder device 120. OEM builder device 120 will then forward the commissioning complete confirmation message to asset registry 130, as is discussed in more detail elsewhere in this disclosure. This "commissioning complete" confirmation message will generally take the form an electronic message, such as a data packet or other digital communication. This "commissioning complete" confirmation message (or simply, "commissioning complete message" for short) contains a first cryptographic nonce (e.g., "nonce1"), or "nonce" for short. This nonce is generated by the target device. In addition to the nonce, the commissioning complete message also includes values representing the identity of target device 110 and the identity of OEM builder device 120, respectfully. These values may take the form of a variable such as, e.g., a TDiD representing the identity of target device 110, and an OBiD representing the identity of the OEM builder that performed the commissioning actions that were performed in steps 345-360. In other embodiments, different variable names and values can be used to represent the identities of target device 110 and the OEM builder that performed the commissioning action(s).

Additionally, the commissioning complete confirmation message can also include information indicating the commissioning actions that have been performed on target device 110 ("completed commissioning actions"). This information may take the form of a "Commissioning Code" variable, and associated value, as discussed elsewhere in this disclosure. The Commissioning Code variable and value can be expressed in various formats, including a simple alphanumeric value, an XML file, a schema, or any other form of communicating the commissioning actions that were performed. Although generally discussed in the singular throughout this disclosure, the Commissioning Code variable can, in practice, contain multiple commissioning codes. For instance, the Commissioning Code can include a first code indicating a first application to be commissioned, a second code indicating a second application to be commissioned, and a third code indicating a third commissioning action, such as, e.g., commissioning an OS. In one embodiment, the Commissioning Code can include a single value representing multiple commissioning actions. Regardless of the specific format of the Commissioning Code(s), the information provided in this variable (or other construct) allows asset registry 130 to confirm that each of the completed commissioning actions were among the authorized commissioning actions. (Generally speaking, each of the authorized commissioning actions will actually be performed on target device 110. However, all of the authorized commissioning actions do not necessarily have to be performed on target device 110. The functionality disclosed herein will still work even if less than all of the authorized commissioning actions are performed, as long as no unauthorized commissioning actions are performed.) Although not required, the Commissioning Code should generally reflect the same level of specificity as was included in the list of requested commissioning actions and authorized commissioning actions. As is discussed in more detail elsewhere in this disclosure, the Commissioning Code (or similar information) is used by asset registry 130 to confirm that OEM builder device 120 only performed the specific commissioning actions that OEM builder device 120 had authorization to perform on target device 110.

When generating the commissioning complete message, target device 110 cryptographically binds the aforementioned information (e.g., nonce1, TDiD, OBiD, and Commissioning Code, and/or similar values and/or other information) within a Message Authentication Code (MAC). Cryptographically binding this information within the MAC makes the message unique, and prevents an intermediary device (e.g., OEM builder device 120) from modifying the substance of the commissioning complete message. (As noted above, OEM builder device 120 can add information to the commissioning complete message, but OEM builder device 120 cannot change the substance of the message as sent by target device 110.) As indicated above, the MAC is based on a security algorithm such as DSA, ECDSA, RSA, or any other appropriate security algorithm. Regardless of which security algorithm is used, in one embodiment the MAC is generated based on the nonce (e.g., "nonce1"), the identification value for target device 110 (e.g., "TDiD"), the identification value for OEM builder device 120 (e.g., "OBiD"), and the Commissioning Code(s). In other embodiments, different inputs may be used to generate the MAC. Moreover, as stated above, different variable names for each of these inputs may be used in different embodiments. Once the commissioning complete message has been generated, target device 110 will complete step 365 by sending that commissioning complete message to OEM builder device 120, which will generally be done via the secure connection established in step 340.

As was discussed in conjunction with FIG. 2, above, OEM builder device 120 will forward this commissioning complete confirmation message to asset registry 130. As is discussed elsewhere herein, this confirmation message enables asset registry 130 to confirm that OEM builder device 120 only performed the specific commissioning actions that OEM builder device 120 had permission to perform. This is important because, as was discussed above, even though a prior trust relationship exists between asset registry 130 and target device 110, and a separate prior trust relationship exists between asset registry 130 and OEM builder device 120, asset registry 130 nevertheless does not originally know whether OEM builder device 120 is trusted by target device 110. In other words, asset registry 130 does not originally have any information indicating whether OEM builder device 120 is allowed to perform any actions (such as, e.g., commissioning) on behalf of target device 110. Moreover, this confirmation complete message further indicates to asset registry 130 that, even if OEM builder device 120 did have authority to perform certain actions on target device 110, OEM builder device 120 did not perform any actions on target device 110 that went beyond the scope of that authority. In other words, the every commissioning action that OEM builder device 120 performed was among the authorized commissioning actions.

After validating the commissioning complete message and verifying the list of completed commissioning actions, asset registry 130 will then generate an acknowledgment message ("ACK"), which is discussed in more detail elsewhere in this disclosure. Asset registry 130 will forward this ACK message to OEM builder device 120, which will then forward the ACK message to target device 110 (as discussed in more detail elsewhere in this disclosure).

Target device 110 receives the acknowledgement message in step 370. Upon receipt of this message, target device 110 uses its own nonce (e.g., nonce1) to validate that this message was sent from asset registry 130. In another embodiment, the Commissioning Code is also considered in performing this validation. By completing this validation, target device 110 confirms that OEM builder device 120 only performed the authorized commissioning actions. At this point, method 300 and the overall commissioning process disclosed herein, end.

Asset Registry's Role in Commissioning

Figure 4:
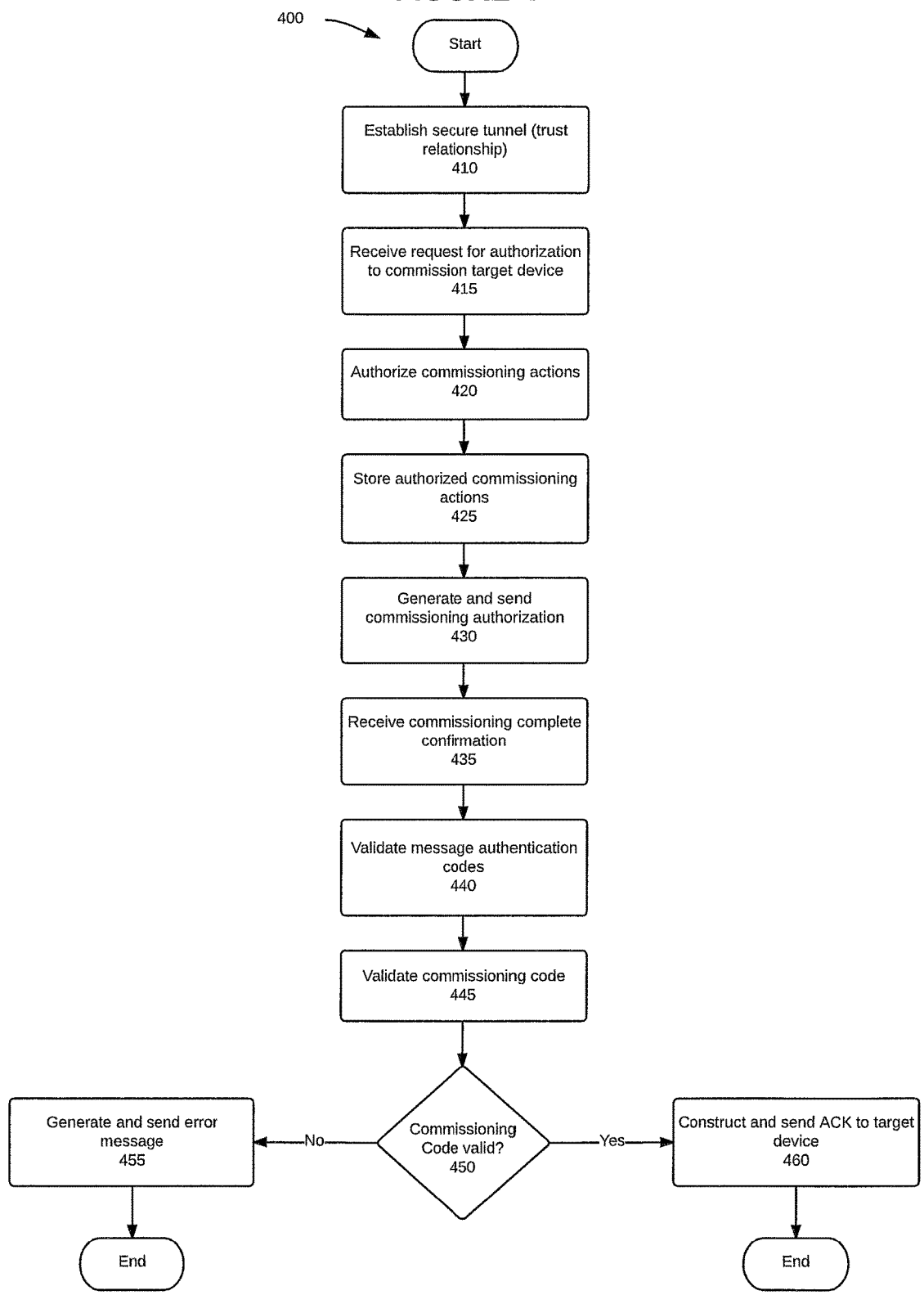
FIG. 4 is a flowchart that illustrates actions that can be performed by an asset registry as part of commissioning a target device, in conjunction with an OEM builder or OEM builder device, according to one embodiment.

FIG. 4 is a flowchart of method 400, which illustrates various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 400, which is described with reference to the example elements shown in FIG. 1, shows the workflow used to commission a target device, as understood from the perspective of the asset registry. This portion of the commissioning process begins in step 410, where asset registry 130 receives a request from OEM builder device 120 to establish a secure tunnel, i.e., "a trust relationship." In one embodiment, the trust relationship is established between an OEM builder device, such as OEM builder device 120, and an asset management device, such as asset registry 130. The establishment of this trust relationship includes establishing a protected tunnel, such as a Transport Layer Security ("TLS") tunnel. This protected tunnel can be established via a direct connection, or via a network such as network 140. This secure tunnel can be established by OEM builder device 120 providing, e.g., a digital certificate (such as is described elsewhere herein) or a username-password combination to asset registry 130.

Upon establishing the secure tunnel, or trust relationship, OEM builder device 120 (or an operator of the OEM builder device, such as, e.g., an OEM builder) can request authorization from asset registry 130 to perform the requested commissioning actions on target device 110. This request can take the form of a digital message, such as a data packet or other digital communication. Asset registry 130 receives this request in step 415. This request includes a list of certain, specific commissioning actions (i.e., the "requested commissioning actions") for which OEM builder device 120 is seeking permission to perform on target device 110. As discussed elsewhere herein, commissioning actions can, generally speaking, include, e.g., commissioning an OS, commissioning a network, and/or commissioning one or more applications, among other potential commissioning actions. The list of requested commissioning actions, however, should contain more specificity than the forgoing list of examples. As will be discussed in more detail below, asset registry 130 will use this list of requested commissioning actions in ensuing steps to confirm that OEM builder device 120 only performed the specific commissioning actions that OEM builder device 120 was given permission to perform. Thus, the specificity of the list of requested commissioning actions is important. Therefore, as some examples, instead of requesting permission to commission an OS in general, the OEM builder device should request permission to commission a specific OS, such as various WINDOWS® operating systems (e.g., WINDOWS® XP, WINDOWS® NT, WINDOWS® 2000, and WINDOWS VISTA®), or other operating systems, such as, e.g., a LINUX® operating system. Similarly, instead of requesting permission to generally commission an application, the OEM builder device should request permission to commission a specific application, such as, e.g., various applications that can be used to program PLCs or other devices. Although not required, the list of requested commissioning actions can also include additional detail, such as a version and/or build number for an OS or a software application. (As noted above, the word "list" is used in this disclosure in the generalized sense. Although a "list" may take the form of a "list" data structure, the word "list," as used throughout this disclosure, is not limited to a data structure. That is, although a list may refer to a data structure, the word "list" can also be understood in the generalized, non-technical sense.) This specificity is important because, for example, a certain OEM builder may have authorization to install certain WINDOWS® operating systems, but that does not necessarily mean that the same OEM builder has authorization to install a LINUX® operating system, for example. Moreover, a company may have a certain number of licenses for a given version of a specific component, in which case the asset registry may track those licenses to ensure that the number of installed products does not exceed the number of authorized licenses.

Upon receiving the list of requested commissioning actions in step 415, asset registry 130 then determines which, if any, of the requested commissioning actions OEM builder device 120 is authorized to perform on target device 110. This authorization occurs in step 420. The authorization process can include, at least in part, validating an identification value identifying the target device (e.g., TDiD) and validating an identification value identifying the OEM builder currently performing the commissioning (e.g., OBiD). In one embodiment, the verification process also includes querying an authorization table, authorization database, or similar memory structure or program (collectively, "authorization table"), such as authorization table 139. More specifically, asset registry 130 queries authorization table 139 to determine whether the OEM builder has permission to perform the requested commissioning actions, and whether those requested commissioning actions can be performed on the target device being commissioned. In addition to other information, authorization table 139 includes a list of the specific commissioning actions that each OEM builder is authorized to perform. In one embodiment, authorization table 139 may further include information linking the specific commissioning actions that each OEM builder is allowed to perform, to the specific types or brands of target devices upon which the OEM builder is allowed to perform each of those commissioning actions. For instance, a certain OEM builder may be allowed to commission certain networks on certain devices. In another instance, a different OEM builder may be allowed to commission a MICROSOFT® operating system, such as the example MICROSOFT® operating systems listed elsewhere herein, on a specific type or brand of target device. All of this information is pre-stored in authorization table 139 prior to the performance of the steps disclosed herein.

The resulting of step 420 is a list of authorized commissioning actions. In one embodiment, the list of authorized commissioning actions includes all of the requested commissioning actions for which approval was found via querying authorization table 139. The authorized commissioning actions will usually be identical to the list of requested commission actions, but this need not necessarily be the case. For instance, OEM builder device 120 could request permission to perform three commissioning actions, but may only be granted permission (by asset registry 130) to perform one or two (or even zero) of those requested commissioning actions. In one embodiment, authorization is denied for any requested commissioning action that is not listed, in authorization table 139, as being authorized for that specific OEM builder to perform on target device 110. Thus, the list of authorized commissioning actions can be limited to a subset of the requested commissioning actions. The list of authorized commissioning actions, however, can never include any commissioning actions that were not included among the list of requested commissioning actions.

Once the list of authorized commissioning actions has been determined, the list of authorized commissioning actions is stored in a memory, such as memory 137, as shown in step 425. In one embodiment, the list of authorized commissioning actions can be stored in a logical memory structure, such as a database, table, or file. Although these memory structures are provided as examples herein, the list of request commissioning actions can be stored in any non-transient, computer-readable storage medium, such as memory 137. This information will be used later in this method, to confirm that the OEM builder did, in fact, only perform the commissioning actions that the OEM builder had authorization to perform.

Asset registry 130 then uses the list of authorized commissioning actions to generate a commissioning authorization, such as, e.g., a digital commissioning certificate or token (collectively, "commissioning certificate," or "certificate" for short). In step 430, the commissioning certificated is generated by asset registry 130 and sent to OEM builder device 120. Among other attributes, the commissioning certificate includes information indicating the specific commissioning actions that are authorized to be performed ("authorized commissioning actions") by OEM builder device 120 on target device 110. The information disclosing the authorized commissioning actions can later be used by target device 110 to ensure that all of the commissioning actions being performed (or attempted) by OEM builder device 120 were, in fact, authorized by asset registry 130. In one embodiment, this certificate is signed by asset registry 130, and thus contains information that identifies asset registry 130. In one embodiment, the commissioning certification is also encrypted using a security protocol such as, e.g., Public Key Infrastructure (PKI) or Secure Socket Layer (SSL). After being generated, asset registry 130 completes step 430 by transmitting the commissioning certificate to OEM builder device 120.

Upon receiving the commissioning certificate, OEM builder device 120 can use the commissioning certificate to perform the authorized commissioning actions on target device 110, the process of which is described in more detail elsewhere herein. When the commissioning actions are complete, target device 110 can generate a commissioning complete certificate, which is also described in more detail elsewhere herein. Target device 110 forwards the commissioning complete certificate to OEM builder device 120, which then forwards the commissioning complete certificate to asset registry 130, the process for which is also described in more detail elsewhere herein. Asset registry 130 then receives the commissioning complete confirmation in step 435.

Upon receiving the commissioning complete confirmation message in step 435, asset registry 130 validates the commissioning complete confirmation message in step 440. This validation step includes determining that both MACs (e.g., the MAC from target device 110, and the MAC from OEM builder device 120) that were included in the commissioning complete confirmation message are valid. In step 445, asset registry 130 also validates the Commissioning Code. (As noted earlier in this disclosure, the Commissioning Code can include multiple commissioning codes, even though the Commissioning Code is generally discussed in the singular throughout this disclosure. For instance, the Commissioning Code can include a first code indicating a first application to be commissioned, a second code indicating a second application to be commissioned, and a third code indicating a third commissioning action, such as, e.g., commissioning an OS. Alternatively, the Commissioning Code can include a single value representing multiple commissioning actions.)

In one embodiment, the validation of the Commission Code includes comparing the list of completed commissioning actions (represented by the Commissioning Code) with the list of authorized commissioning actions that was generated and stored earlier in the performance of this method. If asset registry 130 determines through this comparison that any of completed commissioning actions (as indicated by the Commissioning Code) are not among the list of authorized commissioning actions, then the Commissioning Code is not valid. That is, the Commissioning Code will be found to be invalid if the Commissioning Code indicates that OEM builder device 120 performed any commissioning actions that OEM builder device 120 had not previously received authorized from asset registry 130 to perform. Alternatively, if asset registry 130 determines that each and every completed commissioning actions are among the list of authorized commissioning actions, then the Commissioning Code is valid. However, the validity of an otherwise valid Commissioning Code is not negated simply because one or more of the authorized commissioning actions are not completed, as long as no unauthorized commissioning actions are perform. That is, the focus here is on ensuring that every completed commissioning action was authorized, not on verifying whether every authorized commissioning action was actually performed. In any of these scenarios, however, the asset registry can be configured to maintain a secure record of the commissioning actions that are actually performed.

In step 450, asset registry 130 will process the result of the validation of the Commissioning Code. If asset registry 130 determines in step 450 that the Commissioning Code is not valid, then asset registry 130 will generate an error message and send that error message in step 455. At that point, method 400 will end, and no commissioning actions are performed in this iteration through method 400.

However, if asset registry 130 determines in step 450 that the Commissioning Code is valid, asset registry 130 then generates an acknowledgment message, or "ACK," in step 460. This ACK message includes the nonce from target device 110 (e.g., nonce1), and the identification value associated with target device 110 (e.g., TDiD). In another embodiment, the Commissioning Code is also part of this ACK message. Each of these values (e.g., nonce1, nonce2, TDiD, OBiD) will by cryptographically bound in a MAC, and included in the ACK message. In other embodiments, this MAC can be based on different values and/or values represented by different variable names. Asset registry 130 will then forward this ACK to OEM builder device 120, which will then forward the ACK to target device 110, in a manner such as is described elsewhere in this disclosure. At that point, method 400 would end.

In the discussions provided herein, method 400 (and other methods) are described as if a single asset registry is performing all relevant actions. However, in practice, different asset registries can perform one or more of the methods (or steps) disclosed herein at different times. However, each asset registry can only perform the specific commissioning actions that that given asset registry has permission to perform. The authorization table associated with each given asset registry can be used to help track these permissions.

Example Networking Devices

Figure 5:
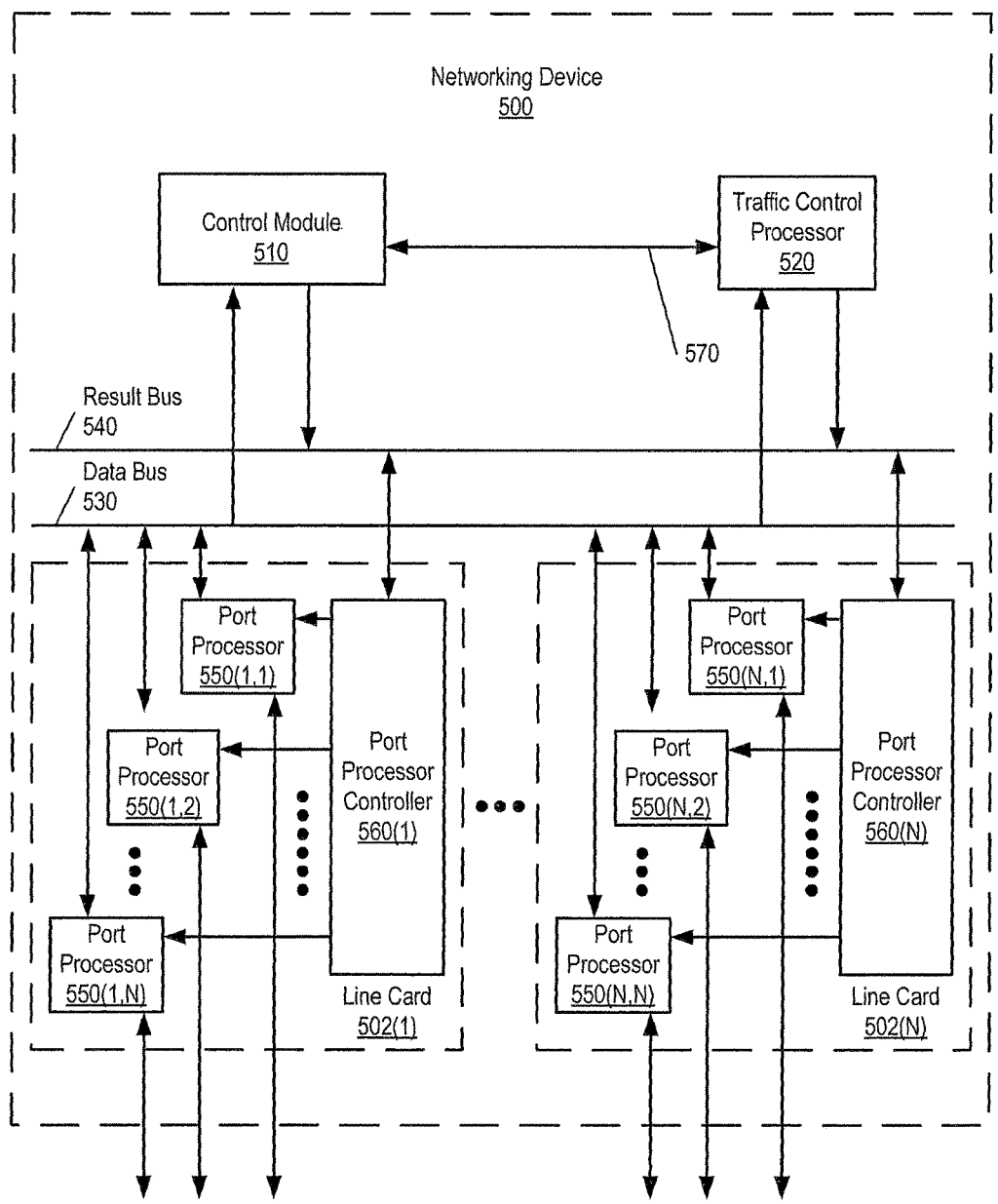
FIG. 5 is a block diagram illustrating components of an example networking device in which the present disclosure can be implemented, according to one embodiment.

FIG. 5 is a block diagram illustrating components of an example networking device 500, which depicts (at least in part) one configuration of a network device or a network routing element (e.g., a hub, router, switch, or similar device). In this depiction, networking device 500 includes a number of line cards (line cards 502(1)-502(N)) that are communicatively coupled to a control module 510 (which can include a forwarding engine, not shown) and a traffic control processor 520 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 520 are not only coupled to one another via data bus 530 and result bus 540, but are also communicatively coupled to one another by a communications link 570. It is noted that in alternative embodiments, each line card can include its own forwarding engine.

When a message (e.g., an authorization request, a commissioning certificate, or a commissioning complete confirmation message) is received by a network device or network routing element such as networking device 500, the message is identified and analyzed in the following manner. Upon receipt, a message (or some or all of its control information) is sent from one of the port processors 550(1,1)-550(N,N) at which the message was received to one or more of those devices coupled to data bus 530 (e.g., others of port processors 550(1,1)-550(N,N), a forwarding engine, and/or route processor 520). Handling of the message can be performance, for example, by a forwarding engine in accordance with the systems and methods disclosed herein. For example, a forwarding engine may determine that the message should be forwarded to one or more of port processors 550(1,1)-550(N,N). This can be accomplished by indicating to a corresponding one(s) of port processor controllers 560(1)-560(N) that the copy of the message held in the given one(s) of port processors 550(1,1)-550(N,N) should be forwarded to the appropriate one of port processors 550(1,1)-550(N,N).

Networking device 500 can be used, for example, in the implementation of a network device (e.g., OEM builder device 120 or asset registry 130) or a network routing element in control module 510, or in one or more of port processor controllers 560(1)-560(N) and/or in route processor 520, in order to implement the present disclosure. Although not shown, network device 500 can also be used to implement a routing protocol module and/or network reachability protocol module in control module 610, in one of port processor controllers 560(1)-560(N), and/or in route processor 520 (not shown).

An incoming message (e.g., an authorization request, a commissioning certificate, or a commissioning complete confirmation message) can be provided to a network device or network routing element via a forwarding engine or port processor of a line card coupled to a port that received the incoming message. Network device 500 can be configured to process the incoming message and to generate one or more outgoing messages (e.g., an authorization request, a commissioning certificate, or a commissioning complete confirmation message), as described throughout this disclosure.

The outgoing message can be provided to a forwarding engine by a network device or a network routing device, which can determine that the outgoing message should be forwarded to one or more of port processors 550(1,1)-550 (N,N) that are configured to transmit the outgoing message toward the outgoing message's destination.

Figure 6:
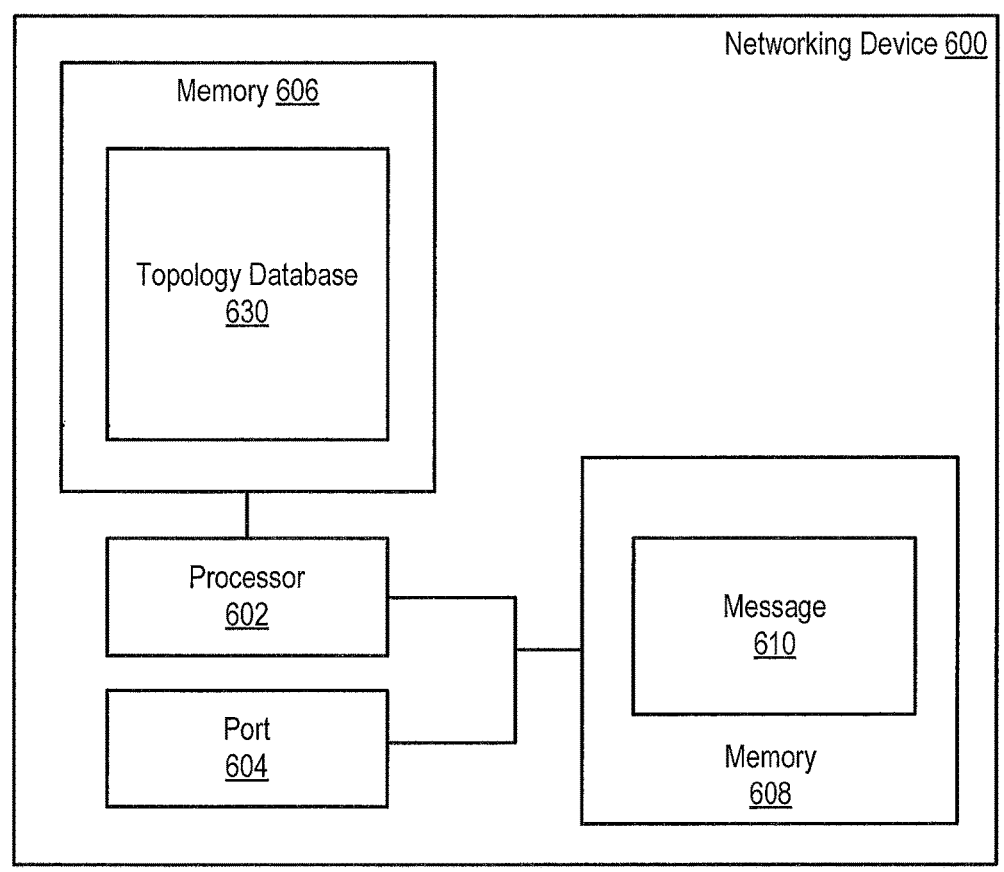
FIG. 6 is a block diagram illustrating components of an example networking device in which the present disclosure can be implemented, according to one embodiment.

FIG. 6 is a block diagram illustrating components of an example networking device 600, in which the networking device is configured as a network device (e.g., OEM builder device 120 or asset registry 130) or a network routing element. As illustrated, networking device 600 includes one or more processors 602 (e.g., microprocessors, PLDs (Programmable Logic Devices), or ASICs (Application Specific Integrated Circuits)) configured to execute program instructions stored in memories 606 and/or 608, which are computer readable storage media. Memories 606 and 608 can include various types of RAM (Random Access Memory), ROM (Read Only Memory), Flash memory, MEMS (Micro Electro-Mechanical Systems) memory, and the like. Networking device 600 also includes one or more ports 604 (e.g., one or more hardware ports or other network interfaces that can be linked to other networking devices, hosts, servers, storage devices, or the like). Processor 602, port 604, and memories 606 and 608 are coupled to send and receive data and control signals by one or more buses or other interconnects.

In this example, program instructions executable to implement the systems and methods disclosed herein are stored in memory 606. Topology information and network reachability information can be stored in one or more topology databases 630.

Message 610 (e.g., an authorization request, a commissioning certificate, or a commissioning complete confirmation message) is stored in memory 608. In one embodiment, message 610 can be received from port 604 (e.g., received from another networking device coupled to port 604), and can be stored in memory 608 before being provided forwarded to another networking device in accordance with the systems and methods of this disclosure. In one embodiment, outgoing message 610 can be generated and stored in memory 608 before being transmitted via port 604.

Example Computing and Network Environment

As shown above, the present disclosure can be implemented using a variety of computer systems and networks. An example of one such computing environment is described below with reference to FIG. 7.

Figure 7:
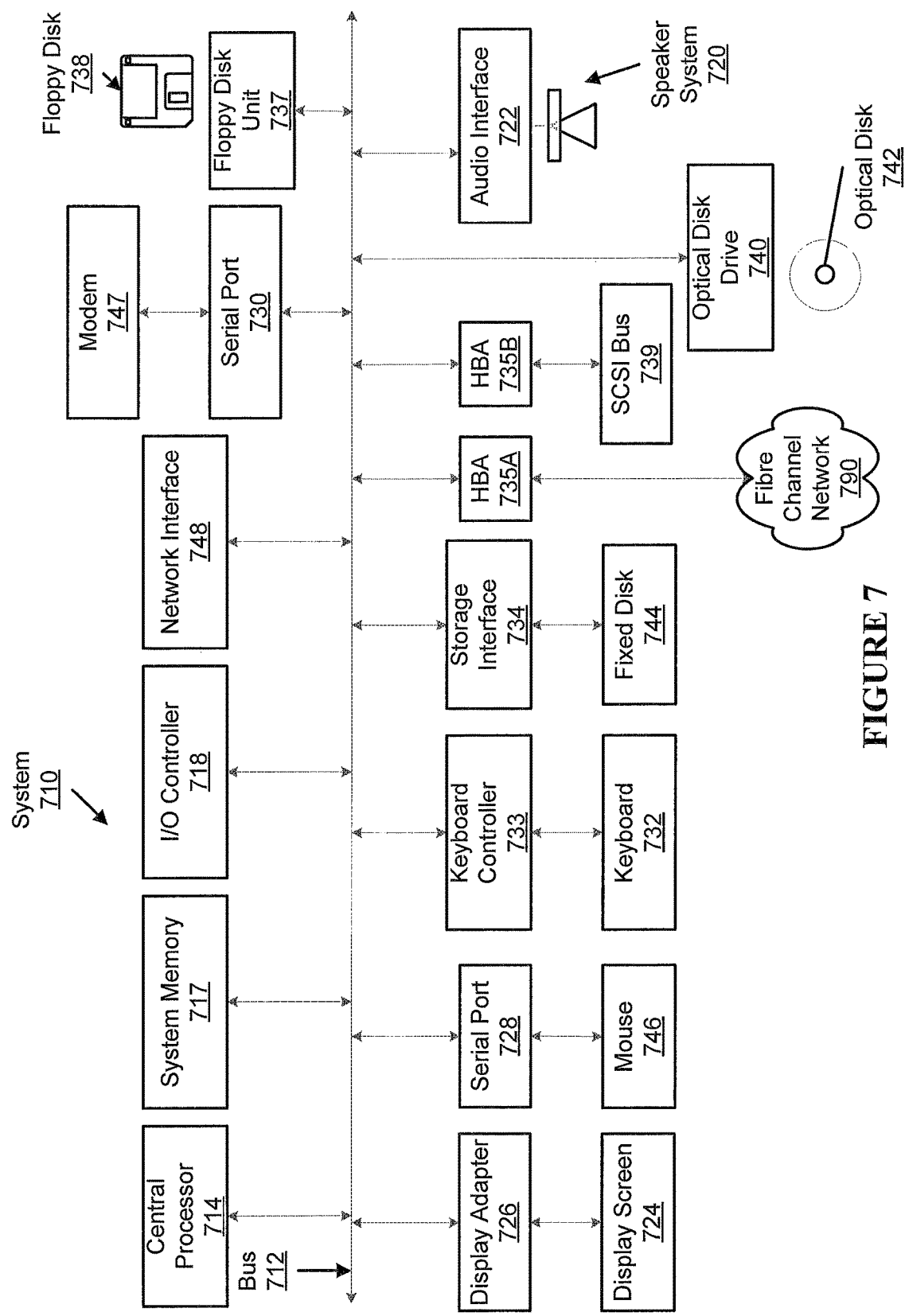
FIG. 7 is a simplified block diagram of a network architecture suitable for implementing aspects of the present disclosure, according to one embodiment.

FIG. 7 depicts a block diagram of a computer system 710 suitable for implementing aspects of the present disclosure. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident within (or otherwise added to or stored in) computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
 receiving a request for authorization to commission a target device, wherein the request for authorization to commission the target device comprises one or more requested commissioning actions, and the request for authorization to commission the target device further comprises an identification value that identifies the target device;

determining whether each of the requested commissioning actions is authorized,
wherein
the determining comprises
determining a plurality of available licenses by querying an authorization table, wherein
the querying uses the identification value that identifies the target device, and
the available licenses are available for use by the target device, and
identifying one or more authorized commissioning actions for which a license is available for use by the target device, wherein the identifying is performed, at least in part, by comparing each of the requested commissioning actions to the plurality of available licenses;

sending a commissioning authorization, wherein
the commissioning authorization comprises information regarding the one or more authorized commissioning actions for which a license is available;

receiving a commissioning complete confirmation message, wherein
the commissioning complete confirmation message comprises a nonce associated with the target device and a commissioning code, and
the commissioning code comprises information identifying one or more completed commissioning actions;

validating the commissioning complete confirmation message, wherein
the validating comprises determining whether each of the one or more completed commissioning actions is among the one or more authorized commissioning actions; and in response to determining that each of the one or more completed commissioning actions are among the one or more authorized commissioning actions, sending an acknowledgement message, wherein
the receiving, the determining, the sending the commissioning authorization, the receiving, the validating, and the sending the acknowledgement message are performed by an asset registry.

2. The method of claim 1, wherein
the asset registry comprises the authorization table.

3. The method of claim 1, wherein
the acknowledgement message comprises
the nonce, and
an identification value associated with the target device.

4. The method of claim 3, wherein
the acknowledgment message is received by the target device, and
the target device validates the acknowledgment message, wherein
validating the acknowledgment message comprises validating the nonce.

5. The method of claim 1, further comprising
in response to determining that at least one of the one or more completed commissioning actions is not among the one or more authorized commissioning actions, sending an error message.

6. The method of claim 1, wherein
at least one commissioning action of the one or more requested commissioning actions is determined to be authorized as a result of a license being available for the at least one commissioning action.

7. The method of claim 1, wherein the method further comprises
prior to receiving the request for authorization to commission the target device, establishing a secure tunnel between the target device and the asset registry.

8. A system comprising
a commissioning module, wherein the commissioning module is configured to perform a first method comprising
receiving a request for authorization to commission a target device,
wherein
the request for authorization to commission the target device comprises one or more requested commissioning actions, and
the request for authorization to commission the target device further comprises an identification value that identifies the target device; and
determining whether each of the requested commissioning actions is authorized, wherein
the determining comprises
determining a plurality of available licenses by querying an authorization table, wherein
the querying uses the identification value that identifies the target device, and
the available licenses are available for use by the target device, and
identifying one or more authorized commissioning actions for which a license is available for use by the target device, wherein the identifying is performed, at least in part, by comparing each of the requested commissioning actions to the plurality of available licenses;
sending a commissioning authorization, wherein
the commissioning authorization comprises information regarding the one or more authorized commissioning actions for which a license is available; and a validation module, wherein the validation module is configured to perform a second method comprising
receiving a commissioning complete confirmation message, wherein
the commissioning complete confirmation message comprises a nonce associated with the target device and a commissioning code, and
the commissioning code comprises information identifying one or more completed commissioning actions;
validating the commissioning complete confirmation message, wherein
the validating comprises determining whether each of the one or more completed commissioning actions is among the one or more authorized commissioning actions; and
in response to determining that each of the one or more completed commissioning actions are among the one or more authorized commissioning actions, sending an acknowledgement message.

9. The system of claim 8, wherein
an asset registry comprises the authorization table.

10. The system of claim 8, wherein
the acknowledgement message comprises
   the nonce, and
   an identification value associated with the target device.
11. The system of claim 8, wherein
the second method further comprises sending an error message, wherein
   the second method is further configured to send the error message in response to determining that at least one of the one or more completed commissioning actions is not among the one or more authorized commissioning actions.
12. The system of claim 8, wherein
at least one commissioning action of the one or more requested commissioning actions is determined to be authorized as a result of a license being available for the at least one commissioning action.
13. The system of claim 8, wherein the first method further comprises
   prior to receiving the request for authorization to commission the target device, establishing a secure tunnel between the target device and an asset registry.
14. A non-transitory computer-readable storage medium comprising a plurality of instructions, executable by a processor, comprising
   a first set of instructions configured to perform a first method comprising
      receiving a request for authorization to commission a target device, wherein
         the request for authorization to commission the target device comprises one or more requested commissioning actions, and
         the request for authorization to commission the target device further comprises an identification value that identifies the target device;
      determining whether each of the requested commissioning actions is authorized, wherein
         the determining comprises
            determining a plurality of available licenses by querying an authorization table, wherein
               the querying uses the identification value that identifies the target device, and
               the available licenses are available for use by the target device, and
            identifying one or more authorized commissioning actions for which a license is available for use by the target device, wherein the identifying is performed, at least in part, by comparing each of the requested commissioning actions to the plurality of available licenses;
      sending a commissioning authorization, wherein
         the commissioning authorization comprises information regarding the one or more authorized commissioning actions for which a license is available; and
   a second set of instructions configured to perform a second method comprising
      receiving a commissioning complete confirmation message, wherein
         the commissioning complete confirmation message comprises a nonce associated with the target device and a commissioning code, and
         the commissioning code comprises information identifying one or more completed commissioning actions;
      validating the commissioning complete confirmation message, wherein
         the validating comprises determining whether each of the one or more completed commissioning actions is among the one or more authorized commissioning actions; and
      in response to determining that each of the one or more completed commissioning actions are among the one or more authorized commissioning actions, sending an acknowledgement message.
15. The non-transitory computer-readable storage medium of claim 14, wherein
an asset registry comprises the authorization table.
16. The non-transitory computer-readable storage medium of claim 14, wherein
the acknowledgement message comprises
   the nonce, and
   an identification value associated with the target device.
17. The non-transitory computer-readable storage medium of claim 14, wherein
the second method further comprises sending an error message, wherein
   the second set of instructions is further configured to send the error message in response to determining that at least one of the one or more completed commissioning actions is not among the one or more authorized commissioning actions.
18. The non-transitory computer-readable storage medium of claim 14, wherein
at least one commissioning action of the one or more requested commissioning actions is determined to be authorized as a result of a license being available for the at least one commissioning action.
19. The non-transitory computer-readable storage medium of claim 14, wherein the first method further comprises
   prior to receiving the request for authorization to commission the target device,
      establishing a secure tunnel between the target device and an asset registry.

* * * * *